United States Patent
Aghajanian et al.

(10) Patent No.: US 7,104,177 B1
(45) Date of Patent: Sep. 12, 2006

(54) CERAMIC-RICH COMPOSITE ARMOR, AND METHODS FOR MAKING SAME

(76) Inventors: Michael K. Aghajanian, 31 Findail Dr., Newark, DE (US) 19711; Allyn L. McCormick, 136 Buttonwood Dr., Lewes, DE (US) 19958

( * ) Notice: Subject to any disclaimer, the term of this patent is extended or adjusted under 35 U.S.C. 154(b) by 236 days.

(21) Appl. No.: 10/649,381

(22) Filed: Aug. 27, 2003

Related U.S. Application Data

(60) Continuation-in-part of application No. 10/286,405, filed on Nov. 1, 2002, now Pat. No. 6,805,034, which is a division of application No. 09/757,826, filed on Jan. 10, 2001, now Pat. No. 6,609,452.

(60) Provisional application No. 60/252,489, filed on Nov. 21, 2000, and provisional application No. 60/175,389, filed on Jan. 11, 2000.

(51) Int. Cl.
*F41H 5/04* (2006.01)

(52) U.S. Cl. ............ 89/36.02; 428/911
(58) Field of Classification Search ......... 89/36.02; 428/911
See application file for complete search history.

(56) References Cited

U.S. PATENT DOCUMENTS

| | | |
|---|---|---|
| 3,205,043 A | 9/1965 | Taylor |
| 3,275,722 A | 9/1966 | Popper |
| 3,495,939 A | 2/1970 | Forrest |
| 3,725,015 A | 4/1973 | Weaver |
| 3,796,564 A | 3/1974 | Taylor et al. |
| 3,857,744 A | 12/1974 | Moss |
| 3,859,399 A | 1/1975 | Bailey et al |
| 3,951,587 A | 4/1976 | Alliegro et al. |
| 3,998,646 A | 12/1976 | Weaver |
| 4,019,913 A | 4/1977 | Weaver et al. |
| 4,104,062 A | 8/1978 | Weaver |
| 4,154,787 A | 5/1979 | Brown |
| 4,241,135 A * | 12/1980 | Lee et al. ........... 428/332 |
| 4,692,418 A | 9/1987 | Boecker et al. |
| 4,693,988 A | 9/1987 | Boecker et al. |
| 4,868,040 A | 9/1989 | Hallal et al. |

(Continued)

FOREIGN PATENT DOCUMENTS

| | | |
|---|---|---|
| DE | 30 05 586 A1 * | 8/1981 |
| JP | 03236599 A * | 10/1991 |
| WO | WO 82/01545 A1 | 5/1982 |
| WO | WO 98/42634 * | 10/1998 |
| WO | WO 00/062007 A2 | 10/2000 |

OTHER PUBLICATIONS

Reaction Based Silicon Carbide; Caramic and Glasses Handbook; p. 293; American Society for Materials, Materials Park, OH (1990).*

(Continued)

*Primary Examiner*—Stephen M. Johnson
(74) *Attorney, Agent, or Firm*—Law Office of Jeffrey R. Ramberg

(57) ABSTRACT

Silicon infiltration technology, e.g., siliconizing or reaction-bonding, is used to produce ceramic-rich composite bodies having utility as ballistic armor. In the main embodiment of the invention, the ballistic armor includes a reaction-bonded silicon carbide body (RBSC). Good ballistic performance can be advanced by loading the porous mass or preform to be infiltrated to a high degree with one or more hard fillers, and by limiting the size of the morphological features making up the composite body. This control of "grain size" can be accomplished by controlling the size of the largest particles making up the porous mass to be infiltrated, but also of importance is controlling the processing conditions, particularly by controlling the factors that cause grain growth, coarsening of microstructure, and/or grain coalescence.

32 Claims, 4 Drawing Sheets

U.S. PATENT DOCUMENTS

| | | | |
|---|---|---|---|
| 4,876,941 A | | 10/1989 | Barnes et al. |
| 4,944,904 A | | 7/1990 | Singh et al. |
| 5,094,901 A | | 3/1992 | Gray |
| 5,205,970 A | | 4/1993 | Brun et al. |
| 5,372,978 A | | 12/1994 | Ezis |
| 5,571,758 A | | 11/1996 | Grossman |
| 5,686,689 A | * | 11/1997 | Snedeker et al. .......... 89/36.02 |
| 5,840,221 A | | 11/1998 | Lau et al. |
| 5,955,391 A | | 9/1999 | Kameda et al. |
| 5,962,103 A | | 10/1999 | Luthra et al. |
| 6,074,750 A | | 6/2000 | Brun et al. |
| 6,245,424 B1 | | 6/2001 | Lau et al. |
| 6,609,452 B1 | | 8/2003 | McCormick et al. |
| 2003/0092558 A1 | * | 5/2003 | Aghajanian .................. 501/91 |
| 2003/0110931 A1 | | 6/2003 | Aghajanian et al. |

OTHER PUBLICATIONS

Aleksander J. Pyzik, P. Douglas Williams, and Ann McCombs, "New Low Temperature Processing for Boron Carbide/Aluminum Based Composite Armor", Final Report to U.S. Army Research Office under Contract No. DAAL 03–88–C0030; Jun. 1, 1990; pp. 1–8; pp. 1A–4A; pp 1B–9B; pp 1C–17C.*

Dennis J. Viechnicki, Michael J. Slavin and Morton I. Kliman, "Development and Current Status of Armor Ceramics", *Ceramic Bulletin*, vol. 70, No. 6, pp. 1035–1039 (1991).

D. Viechnicki, W. Blumenthal, M. Slavin, C. Tracy, and H. Skeele, "Armor Ceramics—1987", pp. 27–53, presented al Third TACOM Armor Coordinating Conference, Feb. 17–19, 1987, Monterey, California.

Roy C. Laible, "Ceramic Composite Armor", in *Ballistic Materials and Penetration Mechanics*, pp. 150–151, Elsevier Scientific Publishing Co., (1980).

C.W. Forrest, P. Kennedy, and J.V. Shennan, "The Fabrication and Properties of Self–Bonded Silicon Carbide Bodies", *Special Ceramics* 5, pp. 99–123 (1972).

* cited by examiner

CERAMIC-RICH COMPOSITE ARMOR, AND METHODS FOR MAKING SAME

CROSS-REFERENCE TO RELATED APPLICATIONS

This is a Continuation-in-Part of U.S. patent application Ser. No. 10/286,405, filed on Nov. 1, 2002, now U.S. Pat. No. 6,805,034, which is a Divisional of U.S. patent application Ser. No. 09/757,826, filed on Jan. 10, 2001, now U.S. Pat. No. 6,609,452 which claimed the benefit of Provisional Application No. 60/252,489, filed on Nov. 21, 2000, as well as Provisional Application No. 60/175,389, filed on Jan. 11, 2000. The contents of each of these commonly owned patent applications are expressly incorporated herein by reference.

BACKGROUND OF THE INVENTION

1. Field of the Invention

This invention relates to ballistic armor structures produced using silicon infiltration technology. More particularly, the invention relates to infiltration techniques to form ceramic-rich composite armor bodies, e.g., reaction-bonded silicon-carbide bodies.

2. Discussion of Related Art

In many armor applications, weight is not a critical factor, and traditional materials such as steel can offer some level of protection from airborne kinetic energy threats such as ballistic projectiles and shell fragments. Steel armors offer the advantage of low cost and the fact that they also can serve as structural members of the equipment into which they are incorporated. In recent decades, certain hard ceramic materials have been developed for certain armor applications. These ceramic-based armors, such as alumina, boron carbide and silicon carbide provide the advantage of being lighter in mass than steel for the same level of protection. Thus, in applications in which having an armor having the lowest possible mass is important, such as (human) body armor and aircraft armor, low specific gravity armor materials are called for. The lower the density, the greater the thickness of armor that can be provided for the same areal density. In general, a thick armor material is more desirable than a thinner one because a greater volume of the armor material can be engaged in attempting to defeat the incoming projectile. Moreover, the impact of the projectile on a thicker armor plate results in less tensile stress on the face of the plate opposite that of the impact than that which would develop on the back face of a thinner armor plate. Thus, where brittle materials like ceramics are concerned, it is important to try to prevent brittle fracture due to excessive tensile stresses on the back face of the armor body; otherwise, the armor is too easily defeated. Rather, by preventing such tensile fracture, the kinetic energy of the projectile perhaps can be absorbed completely within the armor body, which energy absorption manifests itself as the creation of a very large new surface area of the armor material in the form of a multitude of fractures, e.g., shattering.

U.S. Pat. No. 5,372,978 to Ezis discloses a projectile-resistant armor consisting predominantly of silicon carbide and made by a hot pressing technique. Up to about 3 percent by weight of aluminum nitride may be added as a densification aid. The finished product features a microstructure having an optimal grain size of less than about 7 microns. Fracture is intergranular, indicating energy-absorbing crack deflection. Moreover, the economics of manufacturing are enhanced because less expensive, less pure grades of silicon carbide can be used without compromising the structural integrity of the material.

U.S. Pat. No. 4,604,249 to Lihleich et al. discloses a composition particularly suited for armoring vehicles. The composition is a composite of silicon carbide and steel or steel alloy. Silicon and carbon particulates, optionally including silicon carbide particulates, are mixed with an organic binder and then molded to form a green body. The green body is then coked at a maximum temperature in the range of about 800° C. to about 1000° C. The temperature is then rapidly raised to the range of about 1400° C. to about 1600° C. under an inert atmosphere of at least one bar pressure. In this temperature range, the silicon and carbon react to form silicon carbide, thereby producing a porous body. The pores are then evacuated in a vacuum chamber, and the body is immersed in molten steel or steel alloy. The metal fills up the pores to produce a dense composite armor material.

U.S. Pat. No. 3,725,015 to Weaver discloses composite refractory articles that, among other applications, have utility as an armor material for protection against penetration by ballistic projectiles. These compositions are prepared by cold pressing a mixture of a powdery refractory material and about 10 to 35 parts by volume of a carbon containing substance, such as an organic binder material or elemental carbon to form a preform, heat-treating the preform to convert the carbonaceous material to carbon, and then contacting the heated preform with a molten metal bath, the bath containing at least two metals and maintained at a temperature between 1700° C. and 1900° C. The molten metal infiltrates the preform, the refractory material matrix sinters and at least one of the metallic constituents reacts with the carbon to produce a metal carbide. Because the thermal expansion coefficient of the metal mixture is close to or slightly greater than that of the refractory matrix, the composite shape cools to room temperature essentially free of cracks and residual stress. Weaver states that, while there are no rigid particle size parameters except those dictated by the properties desired in the final product, a maximum size of about 350 microns for the particles of the powdered materials that make up the mixture to be pressed is preferred.

U.S. Pat. No. 3,796,564 to Taylor et al. discloses a hard, dense carbide composite ceramic material particularly intended as ceramic armor. Granular boron carbide is mixed with a binder, shaped as a preform, and rigidized. Then the preform is thermally processed in an inert atmosphere with a controlled amount of molten silicon in a temperature range of about 1500° C. to about 2200° C., whereupon the molten silicon infiltrates the preform and reacts with some of the boron carbide. For armor applications, Taylor places a limit of 300 microns as the maximum size for the granular boron carbide component. The formed body comprises boron carbide, silicon carbide and silicon. Taylor states that such composite bodies may be quite suitable as armor for protection against low caliber, low velocity projectiles, even if they lack the optimum properties required for protection against high caliber, high velocity projectiles.

U.S. Pat. No. 3,857,744 to Moss discloses a method for manufacturing composite articles comprising boron carbide. Specifically, a compact comprising a uniform mixture of boron carbide particulate and a temporary binder is cold pressed. Moss states that the size of the boron carbide particulate is not critical; that any size ranging from 600 grit to 120 grit may be used. The compact is heated to a temperature in the range of about 1450° C. to about 1550° C., where it is infiltrated by molten silicon. The binder is removed in the early stages of the heating operation. The silicon impregnated boron carbide body may then be bonded to an organic resin backing material to produce an armor plate.

U.S. Pat. No. 3,859,399 to Bailey discloses infiltrating a compact comprising titanium diboride and boron carbide with molten silicon at a temperature of about 1475° C. The compact further comprises a temporary binder that, optionally, is carbonizable. Although the titanium diboride remains substantially unaffected, the molten silicon reacts with at least some of the boron carbide to produce some silicon carbide in situ. The boron carbide filler is generally limited to about 150 microns in size, but since the titanium diboride component does not appear to react with the silicon under the local process conditions, there is no critical upper limit of its particle size. When certain shaping techniques such as extrusion are employed, however, it is often desirable to limit the particle size to about 125 microns or less. The flexural strength of the resulting composite body was relatively modest at about 140 MPa. A variety of applications are disclosed, including personnel, vehicular and aircraft armor.

Each of the above-described armor inventions suffers from one shortcoming or another. Hot pressing is expensive and shape-limited. Hot pressed or sintered ceramics do not hold dimensional tolerances as well as reaction-bonded silicon carbide ("RBSC"). Iron matrix composite materials are heavy in relation to ceramic armors. An infiltration temperature of 2200° C. is too high, and will likely result in exaggerated grain growth. A preform containing 35 volume percent of reactable carbon will yield excessive amounts of in-situ SiC.

As the preceding synopsis of the patent literature indicates, reaction-bonded or reaction-formed silicon carbide has been proposed and evaluated as a candidate armor material as long ago as the 1960's.

In the Third TACOM Armor Coordinating Conference in 1987, Viechnicki et al. reported on the ballistic testing of a RBSC material versus sintered and hot pressed silicon carbide materials. Not only was the RBSC substantially inferior to the other silicon carbides, Viechnicki et al. came to the general conclusion that purer, monolithic ceramics with minimal amounts of second phases and porosity have better ballistic performance than multiphase and composite ceramics. (D. J. Viechnicki, W. Blumenthal, M. Slavin, C. Tracy, and H. Skeele, "Armor Ceramics—1987," Proc. Third TACOM Armor Coordinating Conference, Monterey, Calif. (U.S. Tank-Automotive Command, Warren, Mich., 1987) pp. 27–53).

Accordingly, in spite of the price advantage of RBSC relative to sintered or hot pressed silicon carbide, what the market has preferred has been a sintered or hot pressed monolithic ceramic product. As of the beginning of the year 2000, there was little or no RBSC armor on the market.

The details of a ballistic impact event are complex. One widely held theory of defeating a ballistic projectile is that the armor should be capable of fracturing the projectile, and then erode it before it penetrates the armor. Thus, compressive strength and hardness of a candidate armor material should be important. The above-mentioned armor patent to Taylor discloses a modulus of rupture as high as 260 MPa, and furthermore states that for armor applications the strength should be at least 200 MPa.

There seems to be a consensus in the armor development community that hardness is indeed important in a candidate armor material, and in particular, that the hardness of the armor should be at least as great as the hardness of the projectile. As for the strength parameter, however, those testing armor materials have had a difficult time correlating mechanical strength (both tensile and compressive) with ballistic performance. In fact, except for hardness, there is no single static property that is a good predictor of good armor characteristics in ceramic materials. Instead, the guidance that has been provided from the armor developers to the materials developers based upon actual ballistic tests has been that candidate armors in general should possess a combination of high hardness, high elastic modulus, low Poisson's ratio and low porosity. (Viechnicki et al., p. 32–33)

U.S. Pat. No. 5,205,970 to Brun et al. discloses a method for making silicon carbide bodies having improved surface finish. In particular, reaction-bonded or reaction-formed silicon carbide bodies are produced by reactively infiltrating silicon into a porous carbonaceous preform to form a silicon carbide body. Excess infiltrant is provided to provide for complete infiltration and filling of porosity in the preform. After infiltration, the excess infiltrant appears as excess droplets on the surface of the reaction-formed body. The formed body is then placed in contact with a wicking means, such as a piece of carbon cloth and re-heated above the infiltrant melting temperature. Excess infiltrant is wicked from the surface of the body into the wicking means by capillary force. Moreover, the wicking means is readily removed from the formed body, as the excess infiltrant that had previously bonded the wicking means to the body has been removed. Any residual wicking means material remaining on the reaction-formed body can be removed by light grinding or diamond polishing.

Another patent to Weaver, namely U.S. Pat. No. 4,019,913, discloses a method for making a high strength RBSC body. Specifically, about 3 micron diameter silicon carbide powder was roll mixed with about 18 percent by weight of colloidal graphite and distilled water. After drying and screening, a tile was cold pressed to yield a silicon carbide filler loading of about 52–53 percent by volume. The preform tile was then infiltrated with silicon at a temperature of about 2070° C. in a nitrogenous atmosphere. The resulting composite body had a final density of about 3.02 g/cc and had a flexural strength of about 530–550 MPa.

Neither Brun nor Weaver '913 advances any suggestion that their materials would be suitable armor materials.

The instant inventors have re-visited RBSC as a candidate armor material because they believe that a RBSC material can be developed whose anti-ballistic performance is competitive with other armor ceramics, such as the hot pressed armors, but at reduced cost.

SUMMARY OF THE INVENTION

It is an object of the instant invention to produce a ceramic-rich ballistic armor whose ballistic performance at least approaches that of commercially available monolithic ceramic armors such as alumina, silicon carbide and boron carbide.

It is an object of the instant invention to produce a lightweight composite material that has utility as armor against ballistic projectiles, and specifically to engineer a ceramic-rich composite as an armor material.

It is an object of the instant invention to produce a ballistic armor less expensively than hot pressed ceramic armors.

It is an object of the instant invention to produce a ceramic-rich ballistic armor body that exhibits minimal dimensional change during processing.

These objects and other desirable attributes can be achieved through the application of silicon infiltration techniques to the production of dense composite materials that have utility as armor bodies. A preferred but by no means the only embodiment of this technology is that of reaction-formed or reaction-bonded silicon carbide. According to this technique, a molten infiltrant containing silicon is contacted to a porous mass containing at least some carbon. The molten infiltrant infiltrates the porous mass without a pressure or vacuum assist to form a composite body of near theoretical density. Concurrent with the infiltration, the silicon component of the infiltrant reacts with at least the free carbon in the porous mass to form in-situ silicon carbide. Typically, some residual infiltrant metal remains in the composite body.

Important to the instant invention is achieving a large volume fraction of one or more very hard materials in the composite body, such as silicon carbide, thus the term "ceramic-rich" composite body. However, for reasons that will be discussed in more detail to follow, the majority of the hard phases should be provided as one or more hard filler materials, rather than developed in-situ such as from the chemical reaction of molten silicon with carbon. Thus, the amount of free carbon in the preform that is available to react with the infiltrating silicon-containing melt should be kept below about 10 percent by volume, and preferably kept below about 6 percent. In general, the instant inventors have observed that it may be important to minimize the extent of chemical reaction during infiltration, and also to minimize the extent of microstructural development (such as recrystallization or other forms of sintering). Specifically, the inventors note that these phenomena tend to increase the size of the morphological features making up the microstructure of the composite body, and that such increases rarely enhance ballistic performance. To this end, the inventors also recommend limiting the size of the bodies (e.g., particles) making up the hard filler materials of the preform to be infiltrated. In general, the size of the filler particles should be kept below about 300 to 350 microns in diameter, and the inventors further recommend keeping at least 90 volume percent of all morphological features below about 100 microns in size.

Accordingly, the resulting microstructure of the instant ceramic-rich composite materials features filler particles of limited size, and is a microstructure of limited interconnectivity of the bodies making up the hard phase(s) provided in the porous mass or preform. In other words, the bodies making up the filler material should have no more than a small or slight amount of interconnectedness to one another such as through excessive sintering or recrystallization, or by excessive in-situ SiC formation.

The above-mentioned technique should not be limited to the instant RBSC systems, but should also work with other RBSC systems. It should also work with reaction-formed silicon nitride and siliconized silicon carbide.

Reaction-bonded silicon carbide composite bodies are generally cheaper to manufacture than hot pressed silicon carbide bodies. Additionally, the instant RBSC composite materials maintain their size and shape better than do hot pressed silicon carbide bodies, as expressed or measured by dimensional tolerances. The ability to make ceramic armor plates having complex shaped curves that faithfully reproduce the desired shape can have significant value in meeting the form and fit requirements of the armor purchaser. Typically, armor for weight sensitive applications is specified for purchase in terms of meeting some minimum ballistic performance parameter and meeting some maximum weight or areal density. Because the objective is high ballistic performance and low areal density, both of which parameters are related to thickness but trending in opposite directions, one wants as uniform a thickness to the armor as possible. Thus, this potential of RBSC to produce highly dimensionally accurate shaped articles makes it well-suited for use in the production of armor.

DEFINITIONS

"Areal Density", as used herein, means the mass of an armor system per unit area.

"Ballistic stopping power", as used herein, means the $V_{50}$ projectile velocity per unit of total areal density.

"Fine-grained", as used herein, means that the morphological features making up the microstructure of the ceramic-rich composite bodies of the instant invention are of limited size. Preferably, the microstructure of the instant reaction-bonded silicon carbide bodies is engineered such that the vast majority of morphological features do not exceed about 350 microns in size.

"Inert Atmosphere", as used herein, means an atmosphere that is substantially non-reactive with the infiltrant or the porous mass or preform to be infiltrated. Accordingly, this definition includes gaseous constituents that might otherwise be thought of as mildly reducing or mildly oxidizing. For example, forming gas, comprising about 4 percent hydrogen, balance nitrogen, might be considered an inert atmosphere for purposes of the instant disclosure, as long as the hydrogen does not reduce the filler material and as long as the nitrogen does not appreciably oxidize the infiltrant or filler material.

"Infiltrant", as used herein, refers to the source of silicon or silicon-containing metal used to infiltrate a porous mass or preform to produce a ceramic-rich composite body. For purposes of this disclosure, elemental silicon is considered a metal.

"Infiltrant component", as used herein, refers to the metal component of the composite bodies of the instant invention.

"RBSC", as used herein, means "Reaction Bonded Silicon Carbide".

"Reaction-Bonding", "Reaction-Forming", "Reactive Infiltration" or "Self-Bonded", as used herein, means the infiltration of a porous mass comprising carbon (in a form that is available to react) by an infiltrant comprising silicon to produce a composite body comprising at least some silicon carbide produced in-situ.

"Siliconizing", as used herein, means the infiltration of a porous mass with a molten infiltrant comprising silicon metal, at least the silicon constituent being substantially non-reactive with the constituents of the porous mass, to produce a composite body having a matrix comprising silicon metal.

"Total areal density", as used herein, means the areal density of ceramic armor material plus the areal density of any other material that should properly be considered to be a part of the assembly of components making up an armor system. Examples of other materials would be fiber-reinforced polymeric materials frequently used to back up or encase a ceramic armor plate.

DETAILED DESCRIPTION OF THE INVENTION AND PREFERRED EMBODIMENTS

Figure 1:
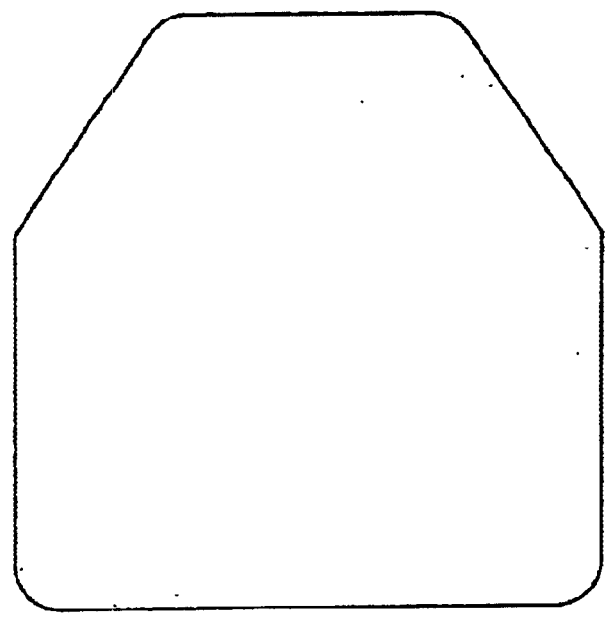
FIG. 1 is a planar projection of a front view of an armor breastplate such as described in Example 1.

In accordance with the instant invention, a substantially pore-free, mechanically strong composite material is produced that comprises a large volume fraction of one or more exceptionally hard materials such as silicon carbide. Furthermore, by placing an upper limit on the size of the reinforcement particles and through careful control of the processing conditions, a superior armor material can be achieved. In addition, the composite bodies produced according to the instant invention maintain dimensional tolerances upon thermal processing better than do hot pressed or sintered bodies.

In a main or preferred embodiment of the instant invention, the ceramic-rich composite armor bodies themselves are made of a reaction-bonded silicon carbide material. In accordance with this embodiment of the instant invention, and specifically where the objective is the production of a superior armor material, the instant inventors have discovered that it is important to place an upper limit on the size of the grains or crystallites making up the composite body. Thus, a very desirable armor material can be produced when the known hardness requirement is combined with a relatively fine-grained microstructure. Being a composite material, the hardness of a RBSC body is proportional to the loading or volume fraction of the hard phases, such as SiC. The preferred approach in the instant invention for achieving high loading of hard phase is to provide a porous mass or preform that is at least relatively highly loaded in one or more hard phases, with SiC being particularly preferred. The instant reaction-bonded silicon carbide (RBSC) composite bodies surpass previous RBSC's as armor materials, and in this capacity approach the ballistic performance of carbide armor ceramics presently in production but feature potentially lower cost manufacturing methods, e.g., infiltration techniques.

As stated above, silicon carbide, a candidate material having very desirable hardness for certain applications envisioned by the instant invention, is difficult to fully densify by traditional approaches such as by sintering. Such materials are amenable to hot pressing, but hot pressing has its drawbacks, for example, its expense and limitations of the possible geometries that can be produced without extensive machining.

Thus, for economy and manufacturing flexibility, among other reasons, the composite armor bodies of the instant invention are usually produced by a reactive infiltration technique, usually termed "reaction forming" or "reaction bonding". In this process, a molten infiltrant comprising silicon is contacted to a porous mass comprising carbon and one or more hard ceramic filler materials such as silicon carbide. The molten silicon-based material infiltrates the interconnected porosity in the porous mass or preform. Concurrently, the silicon reacts with the carbon in the porous mass or preform to form silicon carbide. The amount of infiltrant is generally provided in such a quantity that the carbon in the porous mass or preform is completely reacted to silicon carbide, with sufficient additional infiltrant supplied to fill any remaining void space between the filler material and the in-situ silicon carbide. The resulting composite materials feature a matrix of the in-situ silicon carbide. Dispersed throughout the matrix is the filler and residual, unreacted infiltrant material. As the residual infiltrant is often interconnected, it is sometimes considered as part of the matrix of the composite.

In terms of the preferred processing conditions, atmospheres that are compatible with this type of infiltration include vacuum or inert atmospheres such as argon, although vacuum is preferred. The vacuum does not have to be "hard" or high vacuum; that provided by a mechanical "roughing" pump is entirely adequate. The infiltration may be conducted at most any temperature between the liquidus or melting point of the infiltrant and its boiling point under the local processing conditions. Although the infiltration tends to be more robust at the higher temperatures, it is also more aggressive. In particular, the infiltrant is more reactive at the higher temperatures, which could give rise to unwanted side reactions. Further, it is more difficult to confine the infiltrant spatially at higher temperatures. Moreover, higher processing temperatures are more likely to give rise to exaggerated grain growth. For all of these reasons, the preferred processing temperatures for making RBSC are those that are generally low yet consistent with reliable infiltration. For infiltrating commercially pure silicon into a silicon carbide particulate mass in a rough vacuum environment, temperatures in the range of about 1450° C. to 1600° C. should be satisfactory.

In an alternate embodiment, the ceramic-rich composite bodies of the instant invention can be made by a siliconizing process, such as those that are known in the art. Here, a molten infiltrant comprising silicon, usually commercially pure elemental silicon, is contacted to a porous mass of ceramic material that is wettable by the molten infiltrant under the processing conditions, which is generally taken to be a vacuum or inert gas (e.g., argon) environment. The ceramic material is typically SiC, which can be in the form of substantially non-connected particles such as a loose mass of particulate, or may be in the form of a lightly sintered or "bisque-fired" material, or may be heavily sintered and highly dense. The presence of carbon in the RBSC process assists in the infiltration. Since this carbon is substantially lacking in the siliconizing process, siliconizing is not as robust an infiltration process as is the RBSC process. Accordingly, somewhat higher infiltration temperatures may be required, such as about 1500° C. up to about 2000° C., and/or a vacuum environment (as opposed to inert gas environment, for example) may be required. For making siliconized SiC for armor applications, however, the present inventors recommend that the higher infiltration temperatures and the heavier sintering of preforms (e.g., making the filler bodies more interconnected) should probably should be avoided, for reasons that will be discussed in more depth to follow.

A major theme of the instant invention relates to the specific application of the instant ceramic-rich composite materials as armor for stopping ballistic projectiles. To defeat the incoming projectile, such ceramic-based armors usually feature at least two layers made up of very dissimilar materials. Namely, at a minimum, an armor system contains a ceramic layer and a backing layer, which typically are bonded to one another. As the name suggests, relative to the direction of travel of the projectile, the backing layer is placed behind the ceramic layer. Sometimes, one or more layers of a protective material are also placed in front of the ceramic layer, but these are usually for the purpose of protecting the ceramic from fractures due to routine handling (or mishandling). The purpose of the ceramic layer is to "process" the projectile, such as by flattening or shattering it. The role of the backing layer is to then "catch" the processed projectile as well as any backward propelled fragments of the ceramic layer. The backing layer may be made of metals such as aluminum, steel or titanium, which for vehicular armor, may be the structure of the vehicle itself. Where lightweight armor is needed, the backing layer typically is a fiber-reinforced polymeric (FRP) material. The fibers employed in these backing layers include polyethylene, aramid and glass fibers. A well-known FRP backing material goes by the tradename "SpectraShield", registered to AlliedSignal Inc. (now owned by Honeywell International Inc.); however, several such FRP backing materials are commercially available.

Armor generally takes the form of a plate, but the plates need not be flat, regular polygons. Often, the armor plates must be shaped to conform to the underlying structure to be protected. Body armor, for example, is often curved in one or more dimensions to better conform to the shape of the wearer, e.g., conform to a human torso.

In general, RBSC is cheaper to produce than hot pressed or sintered SiC. Moreover, Si has a lower specific gravity than SiC; therefore, a RBSC composite containing some residual Si will have a lower specific gravity than monolithic SiC. Further, the specific gravity of RBSC is substantially less than that of alumina, a standard ceramic armor material. Accordingly, the economics and the prospect of reduced specific gravity provided sufficient incentive for the instant inventors to re-visit RBSC as a candidate armor material, and to try to engineer it to overcome its reported deficiencies as armor.

According to many who are skilled in the armor arts, what is sought in the way of an armor material is one that fractures and/or erodes the impacting projectile before it can penetrate the armor material. Viechnicki et al. (ibid.) have shown that all that is required in terms of hardness is for the armor to have at least the same hardness as the projectile, but that further increases in hardness over the required "threshold" level do not add significantly to the performance level.

The overall hardness of the ceramic-rich composite material of the instant invention is proportional to the hardnesses of the constituents of the composite material, and to their volumetric proportions. In terms of developing a high-performing armor material, the instant invention focuses on achieving a sufficiently high volumetric loading of the hard ceramic phases such as SiC as to meet overall hardness levels believed to be important, and on limiting the size of the largest grains or crystals making up the composite body. To state it more precisely, substantially all of the morphological features making up the microstructure of the ceramic-rich composite body should be smaller than about 350 microns in size. More preferred is that at least 90 percent by volume be less than about 100 microns in size. Particularly preferred is RBSC having at least 90 volume percent of its morphological features being no greater than about 55 microns in size.

One technique for maximizing the amount of hard phase in the composite body is to produce a porous mass or preform that is highly loaded volumetrically in the hard phases, typically in the form of filler materials having high hardness. Highly loaded preforms can be produced by utilizing a distribution of filler material particle sizes sufficiently wide so that small particles can nest or fit within the interstices of larger particles. Because these two parameters of maximizing the loading of hard fillers in the preform while capping or limiting the size of the largest particles inherently are at odds with one another, careful attention to processing parameters is required to achieve both in the same material. Fortunately, the instant inventors have been relatively successful in attaining preforms highly loaded in hard filler while limiting the size of the filler bodies in such a way that, for example, at least 90 percent by volume are smaller than about 100 microns in diameter. Even with this limit of about 100 microns on the size of the largest particles, it is still possible to produce preforms that are 65 volume percent or more loaded in hard ceramic phases such as SiC.

Such an upper limit to the particle size of the filler materials used in the porous mass or preform can be achieved, among other techniques, by sieving the filler bodies. For example, a 170 mesh and 200 mesh (U.S. Standard) screen yields particles having a maximum size of about 90 microns and 75 microns, respectively. Similarly, 45 mesh and 50 mesh (U.S. Standard) sieve screens pass particles having a maximum size of about 350 microns and 300 microns, respectively.

Some of the hard ceramic fillers used in the Examples to follow have the following particle size distributions as-supplied: Grade F240 CRYSTOLON® SiC (Saint-Gobain/Norton Industrial Ceramics, Worcester, Mass.) has 90 percent by volume of all of its constituent particles being smaller than about 55 microns, and 97 percent smaller than about 70 microns. Grade F320 CRYSTOLON® SiC has 90 volume percent of its particles being smaller than about 37 microns, and 97 percent finer than about 49 microns. Grade F500 CRYSTOLON® SiC has 90 volume percent of its particles being smaller than about 17 microns, and 97 percent finer than about 25 microns. These results were calculated by a distributor of these raw material particulates based on the Eppendorf photosedimentometer.

It may be that limiting the grain size as specified by the instant invention is really a proxy for placing a lower limit on mechanical strength of the composite material. Because limiting the grain size is a necessary but not a sufficient condition for achieving high strength in brittle materials, achieving a high strength target traditionally has been taken as something of a metric for the quality of the ceramic or composite body produced. With brittle composite materials in general and brittle composite materials produced by infiltration in particular, a number of defects can seriously impair the mechanical strength of the resulting composite body. These include non-uniform filler material distribution in the preform, incomplete infiltration of the preform, e.g., leaving porosity and/or unreacted carbon or other reactants in the preform, and excessive grain growth during thermal processing, either of the filler material or of the silicon carbide produced in situ. Such defects probably would also impair the anti-ballistic performance of the material. It may be the case that the microstructures of the ceramic-rich composite materials of the instant invention result in fracture in a different mode than do the prior art RBSC's (e.g., transgranular versus intergranular, or vice-versa) having the larger, more interconnected microstructures.

Whatever the exact reason or operative mechanism, the instant inventors have discovered that RBSC materials of limited grain size and limited interconnectivity of the silicon carbide component are very effective at stopping ballistic projectiles.

Because the hard filler component of the ceramic-rich composite bodies of the instant invention is so much harder than the silicon component (Vickers Hardness of about 2500 kg/mm$^2$ for SiC, for example, versus about 1100 kg/mm$^2$ for Si), the overall hardness of the composite body is strongly dependent upon the relative amounts of each phase. Thus, when the end-use article of the instant composite material is armor for protection against ballistic projectiles, it may be important that the composite body contain a large volume fraction of the hard phase(s), particularly where the residual infiltrant component is softer than silicon, a scenario that will be discussed in more detail below. In a reaction-formed silicon carbide composite material, some silicon carbide is produced in situ. Thus, it is possible to form a composite body that is highly loaded in silicon carbide by infiltrating silicon into a porous mass containing large amounts of carbon. For reasons that also will be discussed in more detail below, this approach is not preferred. Instead, what is desired is to reactively infiltrate a porous mass or preform that is highly loaded not with carbon but rather with the hard ceramic phase(s) of the filler material(s). In an alternate embodiment, a preform highly loaded with hard filler materials but little or no reactable carbon is infiltrated with molten silicon (e.g., "siliconizing") or silicon-containing metal.

Techniques for maximizing the volumetric loading of filler materials in the porous mass or preform are well known, and usually take the form of blending a plurality of filler material bodies, for example, particles, having a distribution of sizes, in such a way that smaller particles tend to fill the interstices between larger particles. There are limits, however, to the extent of the distribution of particle sizes. For example, where there is a potential for chemical reaction (for example, when the hard ceramic filler includes boron carbide), smaller particles tend to be more reactive than larger particles due to their large total surface area. At the other end of the scale, at some point, large-sized filler material particles will begin to reduce the strength of a composite body that fails by a brittle fracture mechanism due to the introduction of critical-sized flaws into the material. Further, whether it is strength-related or not, there are examples in the prior art of large-grained or relatively large-grained RBSC bodies that were not superior armor materials.

Although most any of the known techniques may be employed to produce a porous preform that can be infiltrated by a molten infiltrant comprising silicon, the techniques that seem to be better able at producing preforms that are highly loaded with one or more fillers are those that utilize a liquid phase, for example, sediment casting, slip casting or thixotropic casting. But other well-known ceramic processing techniques such as dry pressing may also be entirely satisfactory, depending on the particulars of the composition being pressed.

Recently, it has become known to alloy the infiltrant metal used to make a reaction-formed silicon carbide body so that the metal phase of the formed body includes a constituent other than silicon. For example, the infiltrant may comprise an alloy of silicon and aluminum to yield a phase in the formed silicon carbide body comprising metallic aluminum or aluminum plus silicon, sometimes known as "aluminum-toughened silicon carbide composites". Such bodies containing an alloy infiltrant phase often are softer but tougher than similar bodies having essentially pure silicon as the infiltrant phase. In spite of the hardness reduction, such RBSC's having an alloyed infiltrant phase might still function well as armor materials. For example, the property of compressive strength may be an important factor contributing to good anti-ballistic character, particularly when combined with high hardness. The compressive strength of the composite body might be increased by introducing a ductile aspect to the mechanical failure mechanism. The siliconizing process should also be amenable to the addition of other (non-silicon) metals to the infiltrant.

Such "aluminum toughened" silicon carbide composite bodies have not been optimized for ballistic performance, but it appears that there may be some limit as to the extent of such alloying with softer but tougher metal, at least when the alloying element is aluminum. Aluminum is of course very soft compared to silicon, and where the infiltrant component in a reaction-formed body containing 70 percent by volume of silicon carbide exceeds about 35 percent by volume of aluminum (balance silicon), the composite hardness falls below that of cemented tungsten carbide. Above about 70 percent aluminum in the infiltrant phase, the hardness drops below that of tool steel, suggesting that such armor might not be effective against even a tool steel projectile, such as that fired from small arms.

In a preferred embodiment, the porous mass or preform contains one or more substantially inert filler materials. By this is meant a filler material that is substantially non-reactive with the molten infiltrant under the local processing conditions. One such filler material that is especially preferred is silicon carbide, as molten silicon more easily wets silicon carbide than other inert materials, such as oxides. However, it should be possible to admix at least some amount of other filler materials that may not be as wettable as silicon carbide under the local processing conditions and still achieve wetting and infiltration of the overall porous mass by the molten silicon. Examples of such alternative filler materials include titanium diboride, titanium carbide, silicon nitride and aluminum nitride. It should even be possible to admix at least some amount of "non-wettable" filler materials (e.g., aluminum oxide) with "wettable" filler materials and still accomplish wetting and infiltration of the overall porous mass by the molten silicon.

As alluded to previously, the hard filler materials desirable for armor applications include boron carbide. Boron carbide is particularly desirable for armor applications because it is even harder than silicon carbide. In addition, it is lighter, that is, it has a lower theoretical density, around 2.5 g/cc versus about 3.2 g/cc for SiC. Molten silicon can chemically attack boron carbide; however such deleterious results can be minimized and perhaps eliminated by several techniques such as minimizing the time and temperature of exposure to molten silicon, using as large a particle size as possible or at least avoid using very finely divided boron carbide particles, etc.

The filler material making up the porous mass to be infiltrated may be provided in a number of different morphologies, including particulates, platelets, flakes, whiskers, short fibers, continuous fibers, microspheres, aggregate, etc. Particulates are often preferred for reasons of economy and availability.

It is possible to distinguish the silicon carbide matrix that is reaction-formed from the silicon carbide making up the reinforcement or filler material. Specifically, the reaction-formed silicon carbide typically is of the beta polymorph, at least under the instant processing conditions. In contrast, most commercially available silicon carbide, particularly the commodity grades, is the alpha form that is so commonly used as a filler material. Accordingly, analytical techniques known to those in the art can distinguish between the two forms and can provide at least approximate quantitative data as to the relative amounts of each that are present in the composite body.

A wide range of sizes of filler material bodies can be successfully infiltrated using the reaction-forming process, e.g., bodies ranging from several millimeters in size down to bodies on the order of a micron in size. Again, when the goal is to produce a body having attributes of a ballistic armor, the filler bodies, and in fact, all of the morphological features making up the composite body should be kept below about 300–350 microns.

Previously, the inventors recommended that the size of the morphological features (e.g., crystallites, etc.) be kept below about 100 microns or so. However, if certain reaction conditions are kept under control as described in the following paragraphs, then it may be possible to use particles larger than about 100 microns and still achieve good ballistic performance.

As mentioned earlier, some of the early RBSC armor featured SiC particulate up to 300 or 350 microns in size. Although reported as "good" ballistically, with the probable economic advantage of RBSC over hot pressed SiC, seemingly there would have been commercially available RBSC armor years ago, but this has not been the case. Viechnicki found that RBSC had a ballistic performance level that was only about 71% as good as sintered SiC, at least against a tungsten quarterscale long-rod penetrator, which threat may be different from that presented by small arms fire (Viechnicki, p. 43).In addition, the porous mass of filler material should not be exposed to excessive temperatures, especially during infiltration. Here, "excessive" means temperatures at which grains can grow appreciably. For example, the transformation of silicon carbide from the beta to the alpha crystallographic form occurs at about 2050° C. The crystallographic transformation is often accompanied by extensive grain growth. Depending upon the exact conditions, it may be possible to heat to a slightly higher temperature (perhaps about 2100° C.) and still avoid this recrystallization. Still, it would be advisable not to conduct the infiltration, or post-process the infiltrated mass, at temperatures in excess of about 2000° C.

Moreover, the infiltrant should not undergo excessive reaction as it infiltrates the porous mass or preform. For example, the porous mass to be infiltrated often contains free or elemental carbon as a carbon source to form some in-situ silicon carbide (e.g., in RBSC systems). The amount of this free carbon should be limited to (generally) no more than about 10 percent by volume of the porous mass, and preferably, no more than about 5 or 6 percent. Thus, in general, the amount of silicon carbide produced in-situ should be limited to no more than about 24 volume percent of the final composite body, and preferably no more than about 12 to 14 volume percent. Among the problems that result from excessive reaction during the infiltration process are temperature spikes due to the exothermnic nature of the chemical reaction of silicon and carbon. Such temperature spikes can cause cracking due to localized thermal expansion. In addition, the conversion of elemental carbon to silicon carbide entails a volumetric expansion of about 2.35 times. Thus, large amounts of reaction are also detrimental from the standpoint that the large volumetric change may cause cracking.

Figure 5A:
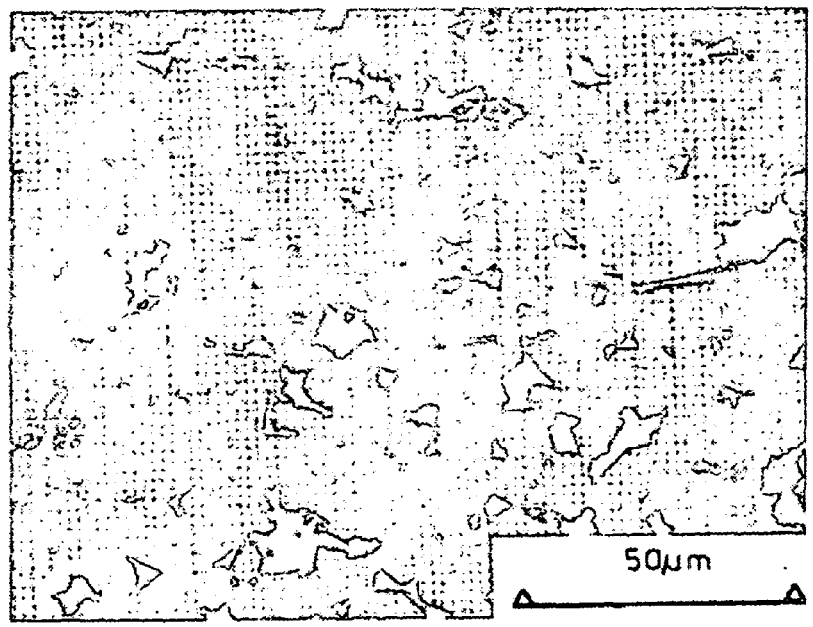
FIGS. 5A and 5B are optical photomicrographs of RBSC microstructures of the prior art and of the instant invention, respectively.
Figure 5B:
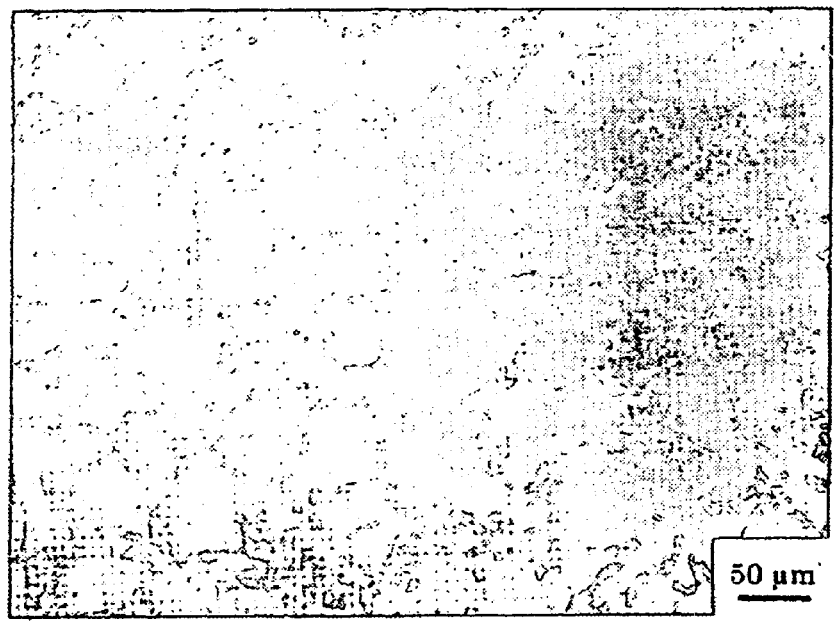

What the instant inventors have noticed, however, is that many of the prior art RBSC publications expressly disclose processing conditions that the inventors identify as entailing "excessive reaction", as warned against immediately above. What results is excessive grain growth and coalescence or fusing of individual grains or morphological features (e.g., grains) into larger ones. See, for example, FIG. 5A. In contrast, the instant inventors have produced ceramic-rich composite materials for armor having good ballistic performance and that have microstructures similar to what is shown in FIG. 5B. This microstructure is characterized by minimal chemical reaction, little to no recrystallization of the SiC, and minimal coalescence, sometimes referred to as "clumping". Thus, the instant inventors assert that as long as one can continue to produce ceramic-rich composite materials with these microstructures exhibiting minimal interconnectivity of the SiC particles (which were initially provided as discrete entities), one may increase the filler particle size somewhat above 100 microns or so and still obtain acceptable ballistic performance. For example, it may be possible to increase the size of the filler particles up to the 300–350 micron range.

Accordingly, the resulting microstructure of the instant ceramic-rich composite materials is one of limited interconnectivity of the bodies making up the hard phase(s) provided in the porous mass or preform. In other words, the bodies making up the filler material should have no more than a small or slight amount of interconnectedness to one another such as through excessive sintering or recrystallization, or by excessive in-situ SiC formation. Although not required, a carbon source that may be added to the porous mass or preform can desirably take the form of elemental carbon, such as graphite. For many applications, particularly those requiring high stiffness, it is desirable that the silicon carbide of the resulting composite body be at least partially interconnected. This outcome is more readily achieved if the carbon in the porous mass or preform is interconnected. Further, interconnected carbon in the porous mass or preform assists the infiltration process in terms of speed and reliability. At the same time, excessive amounts of carbon in the porous mass or preform do not appear to benefit the infiltration process and may even be detrimental in terms of being able to produce a strong, crack-free silicon carbide composite body. In a preferred embodiment, the carbon is introduced to the porous mass as a resin. This mixture may then be molded to the desired shape. Curing the resin renders the porous mass self-supporting, e.g., as a preform. During subsequent thermal processing, or during an intervening firing step, typically in a non-oxidizing atmosphere, the resin pyrolyzes to carbon in interconnected form to yield a preform containing at least about 1 percent by volume of carbon. The resin infiltration and pyrolysis cycle may be repeated one or more times if an increase in the carbon content is desired.

In one particular embodiment of the instant invention, ceramic fibers may be adhered to the back face, i.e., opposite to the front or strike face of a ceramic armor using silicon infiltration technology. In particular, it has been unexpectedly discovered that silicon carbide fibers fused to the back of a silicon carbide armor body can enhance the ballistic performance of the armor body. Silicon carbide fibers can be joined readily to SiC-based armor plates by siliconizing or reaction bonding techniques. In fact, a preferred ceramic plate is one made by reaction-bonding, as discussed above. A preferred fiber is SiC made by reactively infiltrating carbon fiber with silicon-containing infiltrant. Particularly preferred is forming a dense ceramic body and SiC fiber, and joining the two, all in a single step. Specifically, carbon fibers, woven or nonwoven, are contacted to the back face of a porous mass or preform, the mass or preform preferably containing at least some carbon. A source of silicon is contacted to an exposed portion of the fibers. Molten silicon is readily wicked into the mass of fibers, and from there into the porous mass or preform. The carbon fibers are chemically converted to SiC fibers, and the carbon in the preform is chemically converted to SiC, thereby forming a RBSC ceramic body. Concurrently, the formed SiC fibers are bonded to the RBSC body as a by-product of the Si infiltration process.

The ceramic fiber making up the rear surface of the silicon carbide armor body may be most any that can be adequately bonded as to result in an enhancement in ballistic performance. The fiber may be discontinuous or in chopped form, but long fibers, e.g., continuous fibers may provide better ballistic performance than shorter fibers. Preferably, the fibers are arranged such that the fiber axes lie within or close to a plane, and even more preferably that the fiber properties are equiaxial within the plane of the backing layer. However, the fibers may be nonwoven, e.g., randomly arranged in a mat, arranged as alternating layers of uniaxial fibers, arranged in the form of a felt, or woven by any of a variety of weaves to form a fabric. The term "cloth", as used in this disclosure, will be understood to include both woven and nonwoven fibers.

Fibers comprising silicon carbide, or a cloth produced from such fibers, may be joined to a silicon-containing ceramic surface by siliconizing. Specifically, it is well known that molten silicon wets silicon-containing ceramics such as silicon carbide or silicon nitride, although temperatures substantially above the melting point of silicon may be required, for example, perhaps around 1700° C. to 2100° C. As pointed out earlier, however, temperatures on the order of 2100° C. and above should be avoided if at all possible because of the potential for grain growth (e.g., via recrystallization of silicon carbide). The atmosphere should be non-oxidizing. Inert atmospheres such as argon are sufficient, with vacuum atmospheres preferred. Here, nitrogen would be an oxidizing atmosphere, at least in the broader sense of the term "oxidizing", i.e., transfer of electrons. More exactly, nitrogen gas would be expected to react with molten silicon to produce silicon nitride, which may or may not be helpful in the context of the instant invention.

To bond a cloth comprising silicon carbide fibers to a silicon-containing ceramic body, e.g., a SiC or $Si_3N_4$-containing body, the cloth is contacted to at least one surface of the body. The cloth and body are heated to the processing temperature under non-oxidizing conditions. The cloth, the body, or both is contacted to a source of molten silicon or silicon-containing alloy. Preferably, silicon in solid form (e.g., powder, lump, ingot, etc.) is pre-positioned in contact with the cloth at ambient temperature, and then the body, cloth and silicon are heated as a unit to the processing temperature. The molten silicon infiltrates at least the smaller voids or pores between the fibers as well as those pores or voids between the fibers of the cloth and the silicon-containing ceramic body. Upon cooling and solidification of the silicon, the cloth is bonded to the silicon-containing ceramic body by the infiltrated silicon in the cloth, which forms a metallurgical bond to the silicon-containing ceramic body.

In a sub-embodiment, the cloth may comprise a precursor to silicon carbide such as carbon. This embodiment is useful at least from a processing standpoint because the chemical reaction assists in the infiltration process. Consequently, the process may be conducted reliably at lower temperatures than in those situations where substantially no reaction occurs. Specifically, with carbon available to react, infiltration of molten silicon can be carried out at temperatures as low as about 1450° C., depending on the amount and contiguity of the carbon, and even lower still for compositions of the infiltrant that lower the eutectic temperature, such as Si—Al alloys. In contrast, when the infiltration is one of siliconizing, i.e., little or no free carbon available for reaction, higher temperatures are usually required for the infiltration to proceed.

The ceramic armor body may be made from any material that can be wet by molten silicon without producing deleterious chemical reactions. As mentioned above, such ceramic materials include silicon carbide. A particularly preferred silicon carbide body is one made by reaction-forming. The instant invention is also expected to work in conjunction with silicon carbide bodies made by other processes, such as sintering or hot pressing. Other ceramic bodies that should be amenable to joining to fibers comprising silicon carbide by means of a silicon bond include ceramic bodies comprising boron carbide and/or silicon nitride.

In a preferred embodiment, the production of the silicon carbide body and the bonding of the silicon carbide fibers to the back face of the body are conducted in a single thermal processing. In particular, the silicon carbide armor body is provided as a porous mass or preform containing at least some carbon. The cloth comprising silicon carbide and/or carbon is contacted to at least one surface of the porous mass or preform. A source of the silicon infiltrant is contacted to the cloth or porous mass/preform or both to form a unit. The unit is heated to at least about 1450° C. under vacuum or inert atmosphere. The silicon infiltrant is molten at this temperature and infiltrates the interconnected porosity in the porous mass or preform, as well as the pores or voids between the fibers making up the cloth. Concurrently, the silicon reacts with the carbon in the porous mass or preform, and with any that may be in the cloth to form silicon carbide. As a continuous pathway of silicon exists from the infiltrated preform to the infiltrated cloth, solidification of the silicon bonds one to the other.

In general, the economics of reaction bonding for making silicon carbide bodies are more favorable than are those of hot pressing. Not only may a plurality of RBSC bodies be thermally processed simultaneously, but also the tooling (typically graphite) lasts longer than that used in hot pressing operations. Further, RBSC processing does not require high pressures nor temperatures as high as required for hot pressing.

The ability to maintain tight dimensional tolerances, particularly on the thickness dimension, is very important in armor applications. Typically, production armor, especially armor for weight-sensitive applications, is warranted or certified to some minimum ballistic protection level as measured by a $V_{50}$ projectile velocity number at a specified maximum weight or areal density. (As a point of information, the ballistic test terminology in this patent document has the same meaning as the same terminology found in MIL-STD-662F.) Because the objective is high ballistic performance and low areal density, both of which parameters are related to thickness but varying oppositely of one another, one wants as uniform a thickness of the armor plate as possible. To more precisely illustrate the issue, the $V_{50}$ specification must be achieved at the lower limit of the permissible thickness range, i.e., the thinnest permissible plate or region thereof, whereas excessively thick plates may exceed the maximum permitted weight.

As long as the overall shape of a ceramic armor plate is within specifications, it is at least theoretically possible to restore non-uniformities developed during thermal processing by means of grinding or machining. Such post-processing operations, however, are usually expensive and rarely are they commercially viable in the body armor market. Accordingly, the ceramic armor body should have uniform thickness in the as-thermally processed condition.

Conformity of the shape of the formed ceramic armor body to the intended shape is also important. The ability to make ceramic armor plates having complex shaped curves that faithfully reproduce the desired shape can have significant value in meeting the form and fit requirements of the armor product. The instant RBSC materials, exhibiting better thickness uniformity than sintered or hot pressed armor ceramics, are also expected to exhibit better shape fidelity than the sintered or hot pressed product.

The following non-limiting examples further illustrate the instant invention.

EXAMPLE 1

This example demonstrates, among other important features of the instant invention, the fabrication of a silicon carbide composite armor plate highly loaded in a fine-grained silicon carbide filler.

An armor "breastplate" and four "feeder rail" preforms were prepared by a sedimentation casting process. Specifically, about 24 parts of de-ionized water were added to 100 parts of CRYSTOLON green silicon carbide (Saint-Gobain/Norton Industrial Ceramics, Worcester, Mass.) and about 6 parts of KRYSTAR 300 crystalline fructose (A.E. Staley Manufacturing Co., Decatur, Ill.) to make a slurry. The silicon carbide particulate consisted of about 65 parts by weight of Grade F320 (median particle size of about 29 microns, blocky morphology) and the balance Grade 500 RG (median particle size of about 13 microns, rounded morphology). The solids and liquids were added to a plastic jar and roll mixed for about 40 hours. The slurry was de-aired in about 760 mm of vacuum for about 5 minutes. About 15 minutes prior to casting, the slurry was re-roll mixed to suspend any settled particulates.

A graphite support plate was placed onto a vibration table. A rubber mold having a cavity of the desired shape to be cast was wetted with a surfactant consisting of a 10 weight percent aqueous solution of JOY dishwashing detergent (Proctor and Gamble, Cincinnati, Ohio). The wetted rubber mold was then placed onto the graphite plate and the surfactant was allowed to dry. The slurry was poured into the cavity. Vibration was commenced.

After the particulates had fully settled (about 3 hours), vibration was halted. The residual liquid on the top of the casting was blotted up with a sponge. The graphite plate and the castings in the rubber mold thereon were transferred from the vibration table to a freezer maintained at a temperature of about minus 15° C.

Once the casting had frozen thoroughly, the rubber mold was removed from the freezer and the frozen casting contained therein was demolded and placed onto a graphite setter tray for drying and bisque firing. For the breastplate preforms, a special setter tray was provided, this specific setter tray being contoured to the shape of the outer face of the breastplate preform. The graphite trays and preforms were then placed into a nitrogen atmosphere furnace at ambient temperature. The furnace was energized and programmed to heat to a temperature of about 90° C. at a rate of about 40° C. per hour, then to hold at about 90° C. for about 2 hours, then to further heat to a temperature of about 600° C. at a rate of about 100° C. per hour, to hold at about 600° C. for about 2 hours, then to cool down to about ambient temperature at a rate of about 200° C. per hour. This firing operation pyrolyzed the fructose, yielding a well-bonded preform containing about 2 percent by weight carbon.

The carbon content of the breastplate preform was increased by re-infiltrating with a 70 percent by weight aqueous solution of KRYSTAR 300 crystalline fructose. Specifically, the preform was submerged in the fructose solution for a total of about 20 hours. For about the first 2 hours, an overpressure of about 60 psi (410 kPa) of air was applied to the solution in an effort to force the solution into the preform more quickly. After halting the pressure application for about 15 minutes, it was resumed at the same pressure. After maintaining the overpressure for about another 2 hours, the pressure was let back to ambient and the preform was permitted to soak in the solution for the balance of the 20 hours. The breastplate preform was then removed from the fructose solution and wiped with a damp cloth to remove excess fructose solution. The preform was then re-pyrolyzed according to the same thermal schedule as described above. The second pyrolysis step added about 3 percent to the overall mass of the preform.

Figure 2:
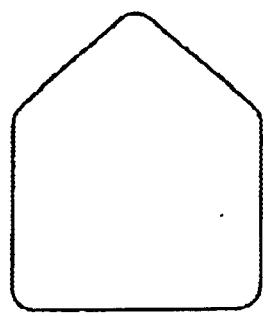
FIG. 2 is a cross-sectional view of a feeder rail as described in Example 1.

The breastplate preform had a mass of about 700 grams and had overall dimensions of about 318 mm long by about 241 mm wide by about 4.4 mm thick. The breastplate was slightly curved in the length and width dimensions. The approximate shape of the breastplate is shown in FIG. 1. Each rail preform had a cross-section as depicted in FIG. 2 and measured about 220 mm long by about 15 mm wide by about 25 mm thick. During infiltration of the breastplate preforms, these rails would serve as a conduit for conducting molten infiltrant toward and into the armor breastplate preform.

A lay-up for infiltration was then prepared.

Figure 3A:
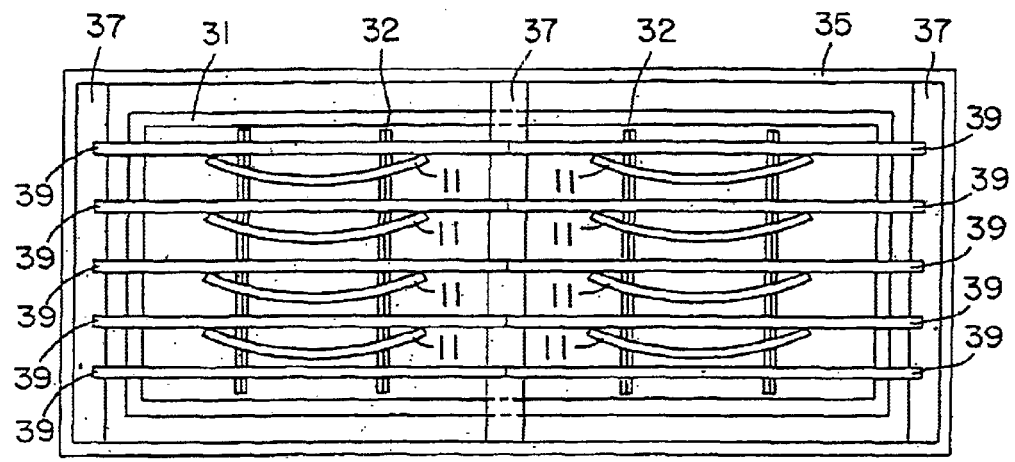
FIGS. 3A and 3B are top and front views, respectively, of a set-up used to prepare silicon carbide composite breastplates according to Examples 1 and 2.
Figure 3B:
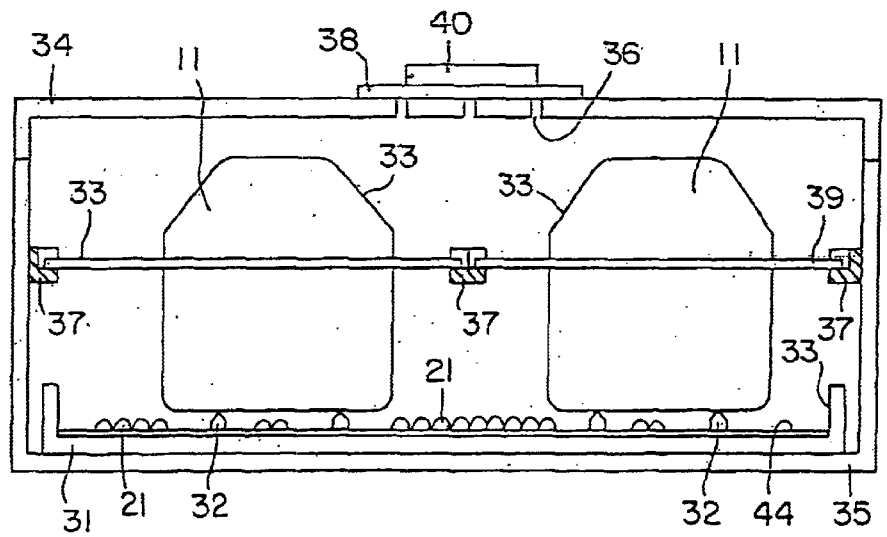

Referring to FIGS. 3A and 3B, the interior surfaces of a Grade ATJ graphite tray 31 (Union Carbide Corp., Carbon Products Div., Cleveland, Ohio) measuring about 790 mm by about 230 mm by about 51 mm deep was spray coated with a boron nitride slurry or paint 33 using a Model 95 Binks spray gun. The boron nitride paint was prepared by diluting about 1800 grams of LUBRICOAT boron nitride paste (ZYP Coatings, Oak Ridge, Tenn.) with deionized water to a volume of about 1 gallon (3.7 liters). Two relatively light coats of this boron nitride paint were applied, with air-drying between coats (20 minutes minimum at 150° C.).

The boron nitride-coated tray was then placed into a larger graphite chamber 35 measuring just slightly larger lengthwise and widthwise than the tray, but being of sufficient height to accommodate the long dimension of the armor breastplate. The chamber also featured means 37 for supporting a parallel array of graphite dowel rods 39.

Infiltration of the Carbon Cloth and Silicon Carbide Feeder Rails

Referring now specifically to FIG. 3B, a single PANEX® 30 low oxidation carbon cloth 44 (Grade PW03, plain weave, 115 g/m$^2$, Zoltek Corp., St. Louis, Mo.) weighing about 25 grams and measuring about 790 mm by about 230 mm was placed on the floor of the coated graphite tray 31,33. Four silicon carbide rail preforms 32, each having a mass of about 190 grams, were placed across the width of the cloth 44, and arranged in pairs, one pair on each half of the tray. Silicon (Grade LP, Elkem Metals Co., Pittsburgh, Pa., lump form) comprising by weight about 0.5 percent Fe (max) and the balance Si, was spread over the surface of the carbon cloth in a sufficient amount to ensure complete infiltration of the cloth, rails and any preform resting on the rails. The top of the chamber was covered with a loose-fitting (non-hermetically sealing) graphite lid 34 featuring a number of 1 cm diameter through-holes 36 to permit atmosphere exchange. The holes were covered with a piece of graphite felt 38 which was held in place with a graphite block 40 which served as a dead load, thereby completing the lay-up.

The completed lay-up was then placed into a vacuum furnace at about ambient temperature (e.g., about 20° C.). The air was evacuated using a mechanical roughing pump, and a rough vacuum of less than about 100 millitorr residual pressure was thereafter maintained. The lay-up was then heated from ambient temperature to a temperature of about 1350° C. at a rate of about 200° C. per hour. After maintaining a temperature of about 1350° C. for about 1 hour, the temperature was further increased to a temperature of about 1550° C. at a rate of about 200° C. per hour. After maintaining a temperature of about 1550° C. for about 1.5 hours, the temperature was decreased to a temperature of about 1450° C. at a rate of about 100° C. per hour. Without holding at this temperature, the lay-up temperature was further decreased to a temperature of about 1300° C. at a rate of about 25° C. per hour, which was immediately followed by a cooling at a rate of about 200° C. per hour to approximately ambient temperature.

Following this heating schedule, the chamber and its contents were recovered from the vacuum furnace. The silicon infiltrant had melted and infiltrated through the carbon cloth and the rail preforms, thereby converting the carbon cloth to silicon carbide cloth, and forming dense, silicon carbide composite feeder rails. From gravimetric analysis, it was determined that there was about 770 grams of uninfiltrated silicon remaining pooled on the silicon carbide cloth. The contents of the graphite chamber were then re-used to fabricate silicon carbide composite armor breastplates.

Infiltration of Breastplate Preforms

About another 1775 grams of silicon 21 (Grade LP, Elkem Metals Co., Pittsburgh, Pa.) and comprising by weight about 0.5 percent Fe (max) and the balance Si, was distributed on the silicon carbide fabric between the silicon carbide composite (e.g., infiltrated) rails. Graphite dowel rods 39 measuring about 0.25 inch (6 mm) in diameter and spray coated with boron nitride paint 33 as described above were placed into graphite holders or supports 37. Four breastplate preforms 11 similarly spray coated with boron nitride 33 were placed across the two rails edgewise in each half of the tray (see FIG. 3A). The surface of each preform contacting the rails was left uncoated. The top of the chamber was covered as previously described to complete the lay-up.

The graphite chamber and its contents were then thermally processed in substantially the same manner as was used to infiltrate the carbon cloth and silicon carbide feeder rail preforms.

Following this heating schedule, the graphite chamber and its contents was recovered from the vacuum furnace and disassembled. The silicon infiltrant had melted, infiltrated through the composite feeder rails and into the armor breastplate preforms to form dense, silicon carbide composite breastplates. Because each breastplate was supported by the rails in line contact on its width dimension, only light hand-applied force was required to separate the formed breastplate composite bodies from the feeder rails. Only a light sandblasting was required to remove several nodules of silicon infiltrant that had exuded through certain points in the boron nitride coating on the breastplates.

EXAMPLE 2

Eight silicon carbide composite armor breastplates were formed in substantially the same manner as in Example 1, with the following exceptions. First, about 22 parts by weight of deionized water was added to about 6 parts of KRYSTAR crystalline fructose (A.E. Staley Mfg. Co.) and about 100 parts of CRYSTOLON green silicon carbide particulate (Saint-Gobain/Norton Industrial Ceramics, Worcester, Mass.). Second, the silicon carbide particulate consisted by weight of about 60 percent Grade F240 (median particle size of about 45 microns, blocky morphology) and the balance Grade 500 RG (median particle size of about 13 microns, rounded morphology).

EXAMPLE 3

Silicon carbide armor breastplates were produced substantially in accordance with Example 2, with the following notable exceptions. First, the back-soaking of fructose solution into the pyrolyzed breastplate preforms was modified somewhat. More exactly, the aqueous solution was about 80 percent by weight of KRYSTAR® crystalline fructose (A.E. Staley Mfg. Co.), and the breastplate preforms were immersed in this solution for a minimum of about 3 hours at ambient pressure only, i.e., with no application of pressure or vacuum to accelerate the back-soaking. Second, the breastplate preforms were not coated with boron nitride. Third, the breastplate preforms were infiltrated with the length dimension instead of the width dimension of the preform in contact with the feeder rails.

EXAMPLE 4

This example demonstrates the bonding of a silicon carbide cloth to a silicon-bearing ceramic body. This example furthermore demonstrates the production of a reaction-bonded SiC composite body suitable for armor applications.

Preforms were prepared by a sedimentation casting process. Specifically, about 25 parts of liquid were added to 100 parts of CRYSTOLON green silicon carbide (St. Gobain/ Norton Industrial Ceramics, Worcester, Mass.) having the rounded particle morphology and 8 to 12 parts of KRYSTAR 300 crystalline fructose (A.E. Staley Manufacturing Co., Decatur, Ill.) to make a slurry. The silicon carbide particulate content consisted of about 90 percent having a median particle size of about 13 microns (Grade 500 Round) and the balance having a median particle size of about 6.5 microns (Grade 800 Round). The solids and liquids were added to a plastic jar and roll mixed for about 40 hours. The slurry was de-aired in about 760 mm of vacuum for about 5 minutes. About 15 minutes prior to casting, the slurry was re-roll mixed to suspend any settled particulates.

A graphite support plate was placed onto a vibration table. A rubber mold having a cavity of the desired shape to be cast was wetted with a surfactant (Sil-Clean, Plastic Tooling Supply Co., Exton, Pa.). The wetted rubber mold was then placed onto the graphite plate and the surfactant was allowed to dry. The slurry was poured into the cavity. Vibration was commenced.

After the particulates had fully settled (about 3 hours), vibration was halted. The residual liquid on the top of the casting was blotted up with a sponge. The graphite plate and the castings in the rubber mold thereon were transferred from the vibration table to a freezer maintained at a temperature of about negative 15° C. The casting was thoroughly frozen in about 6 hours.

From the freezer, the frozen casting was demolded and placed onto a graphite setter tray for drying and bisque firing. The graphite tray and preform were then immediately placed into a nitrogen atmosphere furnace at ambient temperature. The furnace was energized and programmed to heat to a temperature of about 40° C. over a period of about one-half hour, to hold at about 40° C. for about 2 hours, then to heat to a temperature of about 650° C. over a period of about 5 hours, to hold at about 650° C. for about 2 hours, then to cool down to about ambient temperature over a period of about 5 hours. The bisque fired preform was removed from the furnace and stored until the infiltration step. This firing operation pyrolyzed the fructose, yielding a well-bonded preform containing about 2 to 3 percent by weight carbon.

Next, a lay-up to confine the infiltration process was prepared.

Figure 4A:
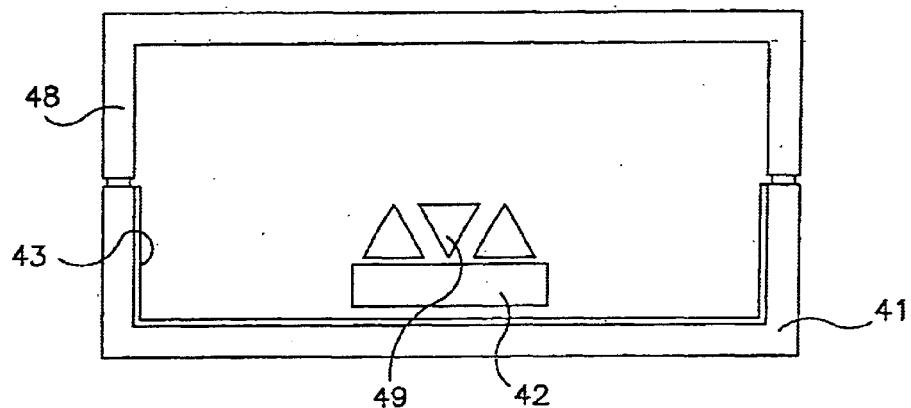
FIGS. 4A and 4B are side views of two embodiments of set-ups used to prepare the SiC fiber-backed silicon carbide composite tiles of Example 4.
Figure 4B:
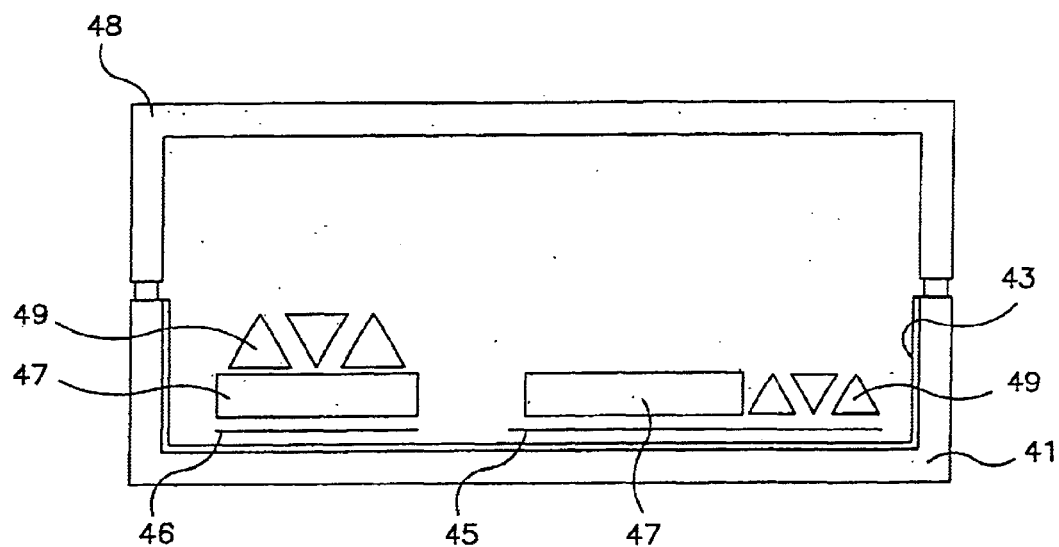

Referring to FIGS. 4A and 4B, the interior surfaces of a Grade ATJ graphite boat 41 (Union Carbide Corp., Carbon Products Div., Cleveland, Ohio) measuring about 375 mm by about 298 mm by about 51 mm deep was coated with a boron nitride slurry or paint 43 at a rate or thickness of about 3 mg per square centimeter. The boron nitride paint was prepared by mixing four parts by weight of LUTBRICOAT boron nitride paste (ZYP Coatings, Oak Ridge, Tenn.) with three parts water and then spray coating using a Model 95 Binks spray gun. The boron nitride coating was then dried, optionally with slight heating to accelerate the removal of water.

Referring now specifically to FIG. 4B, a single PANEX®30 low oxidation carbon cloth 45 (Grade PW03, plain weave, 115 g/m², Zoltek Corp., St. Louis, Mo.) weighing about 5.2 grams and measuring about 200 mm by about 230 mm was placed on the floor of the coated graphite boat 41, 43. Two preform tiles 47, each measuring about 100 mm square by about 4.2 mm thick, and having a mass of about 92 grams each, were placed onto the cloth, close to one 200 mm long edge of the cloth, with a square face of each tile contacting the cloth.

About 100 grams of silicon in lump form 49 (Elkem Metals Co., Pittsburgh, Pa.) and comprising by weight about 0.5 percent Fe (max) and the balance Si, was approximately evenly distributed over the exposed area of the carbon cloth. The top of the boat was covered with a loose-fitting (non-hermetically sealing) graphite lid 48 to complete the lay-up.

The completed lay-up was then placed into a vacuum furnace at about ambient temperature (e.g., about 20° C.). The air was evacuated using a mechanical roughing pump, and a rough vacuum of less than about 100 millitorr residual pressure was thereafter maintained. The lay-up was then heated from ambient temperature to a temperature of about 1350° C. at a rate of about 200° C. per hour. After maintaining a temperature of about 1350° C. for about 1 hour, the temperature was further increased to a temperature of about 1550° C. at a rate of about 200° C. per hour. After maintaining a temperature of about 1550° C. for about 1 hour, the temperature was decreased to a temperature of about 1450° C. at a rate of about 100° C. per hour. Without holding at this temperature, the lay-up temperature was further decreased to a temperature of about 1300° C. at a rate of about 25° C. per hour, which was immediately followed by a cooling at a rate of about 200° C. per hour to approximately ambient temperature.

The furnace atmosphere was brought back to ambient pressure and the lay-up was removed from the furnace. Disassembly of the lay-up revealed that silicon had fully infiltrated the carbon cloth and the preform. Further, the silicon had reacted with the carbon in the preform and that making up the cloth to form silicon carbide. Thus, this reactive infiltration had formed a silicon carbide cloth and a composite body comprising silicon carbide and silicon, with the cloth being bonded to the composite body.

EXAMPLE 5

The procedure of Example 4 was substantially repeated, except that the carbon cloth 46 was cut just slightly larger than a single 100 mm square, 92 gram preform 47, and about 48 grams of silicon (Elkem Metals Co.) in lump form 49 was placed on top of the preform. A reaction-bonded silicon carbide composite body having adhered to it a reaction-bonded silicon carbide cloth was again formed.

EXAMPLE 6

The procedure of Example 5 was repeated, except that each preform was about 4.6 mm thick and had a mass of about 100 grams. No carbon cloth was used. Referring specifically to FIG. 4A, silicon in lump form 49 was placed on top of each preform 42; this silicon had a mass of about 44 grams. At the conclusion of thermal processing, a reaction-bonded silicon carbide composite body was again produced. The formed body had a bulk density of about 3.00 g/cc.

EXAMPLE 7

This Example demonstrates the ballistic performance of a silicon carbide composite body featuring a fibrous silicon carbide layer adhered to the rear face of the composite body.

A number of targets for ballistic testing were prepared. Specifically, the ceramic component of the target consisted of a reaction-bonded silicon carbide composite tile produced substantially in accordance with Examples 4 and 5. This tile measured about 4 inches (100 mm) square by about 0.180 inch (4.6 mm) thick, which included an approximately 0.020 inch (0.5 mm) thick layer of silicon carbide cloth which was reaction-bonded to the back of the tile. Each tile was attached to the center of a SpectraShield® fiber-reinforced plastic backing (AlliedSignal Inc., Morristown, N.J.) measuring about 23 cm by about 20 cm with two plies of double-sided adhesive film to form a ballistic test coupon having an areal density of about 4 pounds per square foot (about 20 kg per square meter). The surface featuring the silicon carbide cloth contacted the SpectraShield® backing. For testing, this ballistic test coupon was then placed in front of 23 plies of a reinforced plastic sheet material comprising KM2 (850 denier) fabric in a nylon matrix, thereby completing the target. The reinforced plastic sheets had a collective density of 1.2 pounds per square foot (5.9 kg per square meter). A block of modeling clay was placed directly behind each target to record the displacement of the target during impact.

The basic unit of ballistic penetration resistance used in this testing is the $V_{50}$, the velocity of the projectile at which partial penetration and complete penetration of the target are equally likely.

The targets were shot at varying velocities with a 7.62 mm ball projectile. The $V_{50}$ was found to be 2649 ft/s (807.4 m/s), with a velocity spread of 72 ft/s (22 m/s). This ballistic performance compares favorably to that of hot pressed silicon carbide armor.

COMPARATIVE EXAMPLE 7

Targets were prepared in the same manner as the above-mentioned targets, except that the silicon carbide composite tiles of Example 6 were used. The $V_{50}$ (with a 74 ft/s velocity spread) for these tiles that did not have a silicon carbide cloth backing was 2512 ft/s (765.7 m/s), with a velocity spread of 74 ft/s (23 m/s).

EXAMPLE 8

This Example further demonstrates the efficacy of a SiC cloth backing to a ceramic armor tile.

Candidate ceramic armor materials were provided in the form of square tiles measuring about 100 mm on a side. Some tiles were of substantially the same composition as the silicon carbide breastplates of Example 1, and are here termed "Composition A". Other tiles were of substantially the Example 2 composition, and are here referred to as "Composition B".

Composition A consisted of about 80 percent by volume of silicon carbide, balance silicon. Its bulk density as measured by the immersion technique was about 3.0 g/cc, and its Young's Modulus as measured by the sonic technique was about 360 GPa Further, a RBSC body very similar in composition and processing to Composition A had a four-point flexural strength as measured by ASTM Procedure No. D790 of about 280 MPa.

The threat was the same in each case. The areal density of the FRP backing layer was kept substantially the same at about 7.11 kg/m$^2$. Except for the last listing for the Composition "A" material, where the backing material comprised 65 plies of SpectraShield® fiber reinforced plastic, the backing material consisted of 30 plies of KM2 fabric reinforced with PVB polymer.

Normalizing the $V_{50}$ with respect to the total areal density yields a parameter referred to in this disclosure as "ballistic stopping power". This parameter is reported in the right-hand-most column of the Tables.

TABLE I

| Material | Ceramic Areal Dens. (kg/m$^2$) | SiC Cloth Layer? | Calc. $V_{50}$ (m/s) | $V_{50}$ per Unit Total Areal Density (m$^3$/kg/s) |
| --- | --- | --- | --- | --- |
| RBSC Composition. "A" | 22.10 | no | 691.2 | 23.66 |
| RBSC Composition "A" | 21.72 | yes | 709.3 | 24.60 |
| RBSC Composition "A" | 22.10 | yes | 915.3 | 31.34 |
| RBSC Composition "A" | 22.10 | yes | 850.1 | 29.10 |
| RBSC Composition "B" | 21.72 | no | 774.8 | 26.87 |
| RBSC Composition "B" | 21.72 | no | 806.8 | 27.98 |
| RBSC Composition "B" | 21.72 | yes | 809.6 | 28.08 |

Table I reports the ballistic stopping power of armor assemblies for the two compositions of the instant invention as a function of the presence of the SiC cloth layer on the back surface of the armor tile. Due to a smaller number of tests in this example compared to the ballistic testing described below in Example 9, all test data are reported. The SiC cloth layer seems to provide a clear improvement for the A composition, but not a clear improvement for the B Composition.

EXAMPLE 9

This example illustrates the inherently good ballistic-resistant qualities of the instant silicon carbide composite materials themselves without any fibrous silicon carbide adhered to the rear surface of a plate of such material. This example furthermore compares this ballistic performance to a high performance (but high cost) ceramic armor such as hot pressed boron carbide.

To produce an appropriate target for ballistic testing, the ceramic tile was attached to a SpectraShield® polymer composite backing layer (AlliedSignal Inc., Morristown, N.J.). This backing layer material was supplied as a 54 inch (1370 mm) wide roll consisting of 2 plies of unidirectional fibers embedded in a resin matrix, with the fibers of one ply being orthogonal to the fibers of the other ply. A number of 12-inch (305 mm) wide sheets were cut from the roll. The appropriate number of these sheets were then laminated and consolidated in an autoclave at an applied pressure of about 150 psi (1.3 MPa) at a temperature of about 121° C. for about 60 minutes, thereby forming a rigid polymer composite plate. Following consolidation, a backing plate measuring about 12 inches (305 mm) square was cut from the 54 by 12 inches (1370 by 305 mm) plate using a band saw or water jet. An approximately 5 inch (120 mm) square region in the center of the backing plate was lightly abraded using 120 grit sandpaper. After cleaning the surfaces to be bonded with isopropyl alcohol, a candidate ceramic armor tile measuring about 100 mm square was bonded to the center of the backing plate using two plies of urethane film adhesive, each film being about 76 microns thick. The bond was cured under full vacuum in an oven maintained at a temperature of about 121° C. for about 30 minutes, thereby forming a ballistic test coupon.

The areal density of the backing plate was varied according to the number of laminates used; the areal density of the ceramic tile was varied according to the thickness dimension to which the ceramic tile was ground. In each instance, however, the total areal density (ceramic tile plus backing material) was maintained at roughly the same amount.

A target for ballistic testing was assembled as follows: The ballistic test coupon was placed in front of 28 plies of KM2 (600 denier) blanket with rip-stop nylon and camouflage cordura covers to simulate the outer tactical vest (OTV) of a wearable body armor system, e.g., a soft body armor garment The OTV simulant and test coupon were placed in front of a 100 mm thick block of Roma Plastiline modeling clay that had been conditioned at a temperature of about 35° C. for about 6 hours. The test coupon and OTV simulant were secured to the clay block with duct tape, and the clay block was backed up by a steel support structure that was secured to the test table, thereby completing the target.

The targets were shot at zero degrees obliquity using two different types of 7.62 mm projectiles at varying velocities. Table II shows the comparative ballistic test results against the first threat; Table III reports the results against the other threat, which was the same projectile as was used to generate the ballistic data reported in Table I. Each candidate armor material was tested several times to determine the best weight ratio of ceramic-to-backing layer material. Thus, unlike the data reported in Table I, here only the performance values for the optimized ratios are reported, i.e., the best results for each ceramic tile composition.

TABLE II

| Material | Ceramic Areal Dens. (kg/m$^2$) | Backing Areal Dens. (kg/m$^2$) | Calc. $V_{50}$ (m/s) | $V_{50}$ per Unit Total Areal Density (m$^3$/kg/s) |
| --- | --- | --- | --- | --- |
| RBSC Composition. "A" | 11.48 | 11.83 | 920.2 | 39.5 |
| RBSC Composition "B" | 13.98 | 9.48 | 951.0 | 40.5 |
| Hot Pressed B$_4$C | 16.62 | 5.913 | 996.7 | 44.2 |

TABLE III

| Material | Ceramic Areal Density (kg/m²) | Backing Areal Density (kg/m²) | Calc. $V_{50}$ (m/s) | $V_{50}$ per Unit Total Areal Density (m³/kg/s) |
|---|---|---|---|---|
| RBSC Composition "A" | 13.78 | 9.480 | 819.3 | 35.2 |
| RBSC Composition "B" | — | — | — | — |
| Hot Pressed B₄C | 16.62 | 5.913 | 848.3 | 37.6 |

Inspection of the normalized $V_{50}$ test data shows that, in terms of ballistic performance (e.g., ballistic stopping power), the instant silicon carbide composite materials were not far behind that of hot pressed boron carbide. Specifically, the $V_{50}$ values of the instant RBSC materials, normalized for total areal density, were within about 10 percent of those of hot pressed boron carbide, which is considered a top-performing ceramic armor material. Because the instant RBSC materials can be produced to tighter thickness specifications in the as-thermally processed condition than can hot pressed boron carbide, this 10 percent ballistic stopping power advantage of boron carbide armor relative to the instant RBSC materials will be diminished somewhat when the dimensional tolerance issue is factored in. Thus, it is fair to say that the performance of the instant RBSC armor materials approaches that of a premier armor material, hot pressed boron carbide.

EXAMPLE 10

This example demonstrates the degree of dimensional reproducibility that can be maintained in producing curved armor plates using a reaction bonding technique for the ceramic densification process. In a manufacturing run using substantially the same procedure as described in Example 2, twenty-one composite armor breastplates were produced. Ten thickness measurements were made around the periphery and in the middle of each of these breastplates. For each breastplate, the mean, range, standard deviation and coefficient of variation of the thickness was computed, then these values were averaged. Table IV reports the thickness variation from a mean thickness of about 0.449 centimeters. Specifically, Table IV reports the average and the highest (representing the breastplate exhibiting the greatest thickness variation) values for each of these four quantities.

TABLE IV

| | Mean (cm) | Range (microns) | Std. Dev. (microns) | Coefficient of Variation |
|---|---|---|---|---|
| Average: | 0.449 | 254 | 81.3 | 1.83% |
| Highest: | 0.452 | 406 | 132 | 2.93% |

In contrast, a production run of boron carbide breastplates made by hot pressing and intended to have a mean thickness of about 0.69 cm displayed a thickness standard deviation of about 250 microns.

INDUSTRIAL APPLICABILITY

The ceramic-rich armors of the instant invention, possessing the desirable properties of low specific gravity and high hardness, should be particularly useful against small arms fire, e.g., as body armor, and as aircraft armor. The instant armors might also find application in marine vessels and ground-based vehicles, e.g., for armor protection against heavier threats. The ability to produce ceramic-rich composite armor having a very uniform and reproducible thickness (e.g., using the instant silicon infiltration technology) is important for being able to manufacture commercial quantities of this product without having to grind or machine the faces of the ceramic armor body to meet the specified dimensions and tolerances.

An artisan of ordinary skill will readily appreciate that numerous variations and modifications can be made to the invention as disclosed and exemplified above without departing from the scope of the invention as set forth in the appended claims.

What is claimed is:

1. A component of a ballistic armor, said component comprising at least one projectile-processing layer and at least one backing layer placed behind and bonded to said projectile-processing layer;

said backing layer comprising at least one fiber-reinforced plastic material;

said projectile-processing layer comprising at least one ceramic-rich composite body comprising
   (a) a matrix comprising at least one metal comprising silicon; and
   (b) at least one filler material comprising a plurality of bodies dispersed throughout said matrix; wherein said ceramic-rich composite body is characterized by a fine-grained microstructure (i) exhibiting no more than a small or slight degree of interconnectivity of the bodies making up the at least one filler material, and (ii) made up of morphological features, wherein no more than about 10 percent by volume of said morphological features are larger than about 300 microns in size, and further wherein said ceramic-rich composite body has a hardness of at least about 1100 kg/mm² as measured with a Vickers indenter using a 1 kg load.

2. The ballistic armor component of claim 1, generally having a plate shape, and being curved in at least one dimension.

3. The ballistic armor component of claim 1, wherein said fiber comprises at least one material selected from the group consisting of polyethylene, aramid and glass.

4. The ballistic armor component of claim 1, wherein said at least one filler material comprises at least one hard phase dispersed throughout said matrix.

5. The ballistic armor component of claim 4, wherein at least about 65 percent by volume of said composite material comprises said at least one filler material.

6. The ballistic armor component of claim 4, wherein at least about 70 percent by volume of said composite material comprises said at least one filler material.

7. The ballistic armor component of claim 4, wherein said at least one filler material comprises a plurality of crystallites, and wherein substantially all of said crystallites are smaller than about 350 microns in diameter.

8. The ballistic armor component of claim 4, wherein no more than about 24 percent by volume of said composite material comprises silicon carbide of said matrix.

9. The ballistic armor component of claim 4, wherein said bodies consist at least predominantly of particulate.

10. The ballistic armor component of claim 9, wherein said bodies further consist essentially of silicon carbide.

11. The ballistic armor component of claim 1, wherein said armor possesses a ballistic stopping power that is at least 90 percent that of a ballistic armor system consisting essentially of a backing layer bonded to a rear surface of a ceramic layer consisting essentially of hot pressed boron carbide.

12. The ballistic armor component of claim 1, wherein up to about 24 percent by volume of said composite further comprises beta-SiC.

13. The ballistic armor component of claim 12, wherein said beta-SiC exists as a coating on said bodies.

14. The ballistic armor component of claim 12, wherein said beta-SiC exists as a reticulated structure at least partially interconnecting said filler bodies.

15. The ballistic armor component of claim 1, wherein said ceramic-rich composite body comprises silicon carbide.

16. The ballistic armor component of claim 15, wherein said ceramic-rich composite body is reaction-bonded silicon carbide.

17. The ballistic armor component of claim 15, wherein said ceramic-rich composite body is siliconized silicon carbide.

18. The ballistic armor component of claim 1, wherein said matrix further comprises silicon carbide.

19. The ballistic armor component of claim 1, wherein said at least one filler material comprises silicon carbide.

20. The ballistic armor component of claim 1, wherein substantially all of said morphological features are smaller than about 350 microns.

21. The ballistic armor component of claim 1, wherein at least about 90% by volume of said morphological features are smaller than about 100 microns.

22. The ballistic armor component of claim 1, wherein no more than about 30 percent by volume of said ceramic-rich composite body comprises said metal.

23. A component of a ballistic armor, said component comprising at least one projectile-processing layer and at least one backing layer placed behind and bonded to said projectile-processing layer;

said backing layer comprising at least one fiber-reinforced plastic material;

said projectile-processing layer comprising at least one ceramic-rich composite body made by a process comprising
 (a) providing a porous body comprising a plurality of bodies of at least one hard filler, interconnected pores, and substantially no free carbon;
 (b) infiltrating said pores with a molten metal comprising silicon; and
 (c) solidifying said molten metal to form a substantially pore-free ceramic-rich composite body consisting essentially of morphological features substantially none of which are larger than about 350 microns in size, and wherein said composite body has a hardness of at least about 1100 kg/mm$^2$.

24. The ballistic armor component of claim 23, wherein said plurality of bodies of said hard filler material exhibit substantially no contact to one another.

25. The ballistic armor component of claim 23, wherein said plurality of bodies of said hard filler material exhibit a small or slight degree of contact to one another.

26. The ballistic armor component of claim 23, wherein said porous body is self-supporting.

27. The ballistic armor component of claim 23, wherein said porous body has been sintered.

28. The ballistic armor component of claim 23, wherein once said porous body is provided, said porous body thereafter is never exposed to a temperature in excess of about 2100° C.

29. The ballistic armor component of claim 23, wherein said porous body comprises silicon carbide particulate.

30. The ballistic armor component of claim 29, wherein said ceramic-rich composite body comprises siliconized silicon carbide.

31. The ballistic armor component of claim 23, wherein said bodies making up said hard filler have a Vickers hardness of at least about 2400 kg/mm$^2$.

32. The ballistic armor component of claim 23, wherein at least about 90% by volume of said morphological features are smaller than about 100 microns.

* * * * *